G. G. BELL.
ELECTRIC HEAT CONSERVING, HEATING, AND COOKING APPARATUS.
APPLICATION FILED JAN. 9, 1911.
1,069,373.
Patented Aug. 5, 1913.
2 SHEETS—SHEET 1.
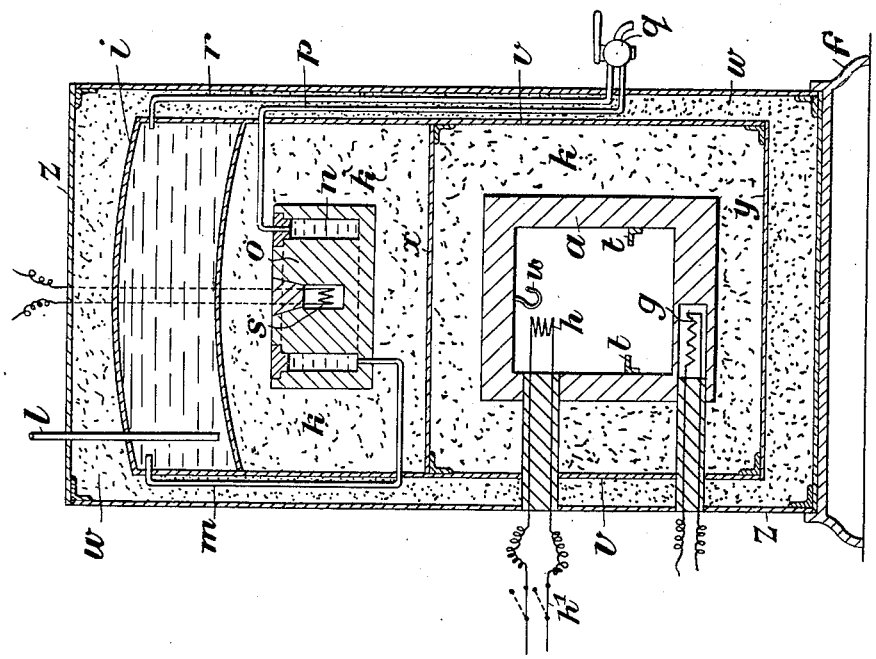
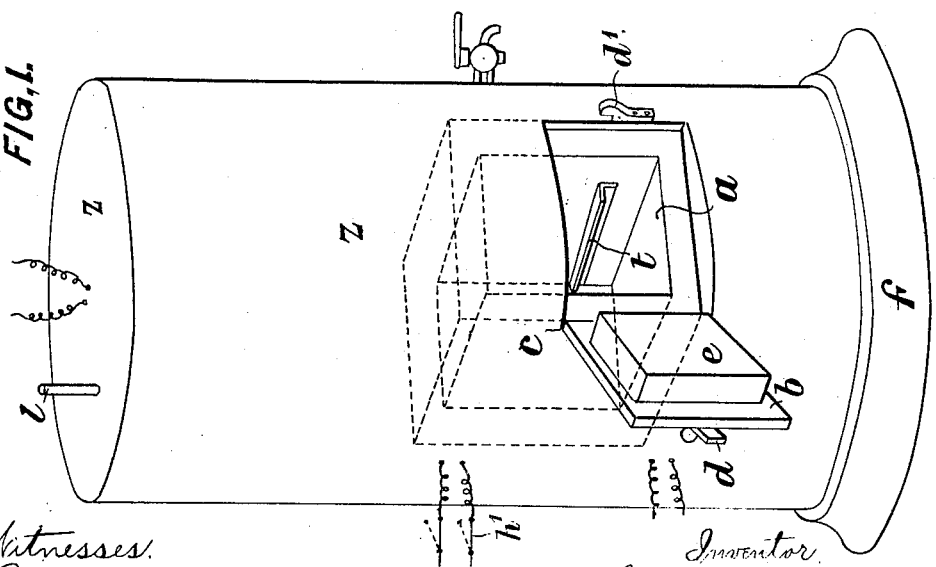
Witnesses:
B. W. Sommers
M. W. Darg
Inventor
George Gilbert Bell.
By Leory Orth Jr.
Atty.

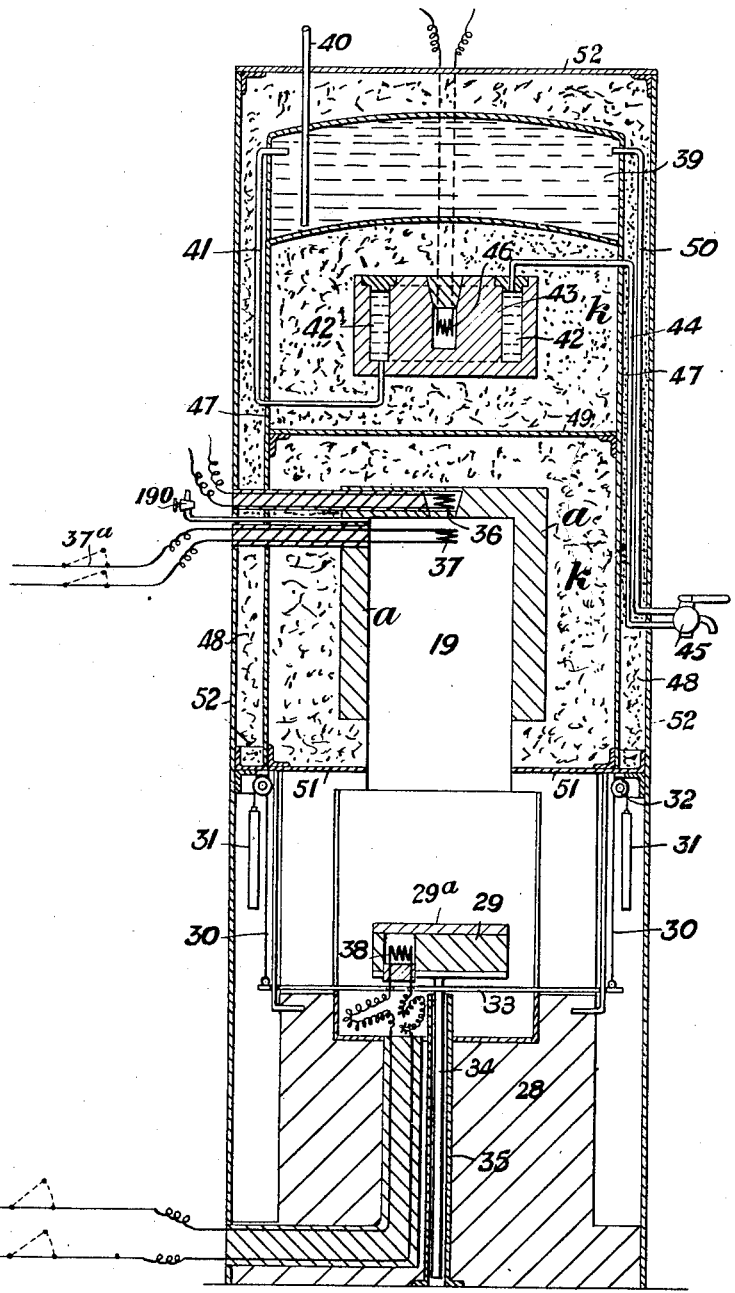

UNITED STATES PATENT OFFICE.

GEORGE GILBERT BELL, OF KENSINGTON, ENGLAND, ASSIGNOR TO ELECTRIC HEAT STORAGE COMPANY, A CORPORATION OF NEW YORK.

ELECTRIC HEAT-CONSERVING, HEATING, AND COOKING APPARATUS.

1,069,373.     Specification of Letters Patent.     Patented Aug. 5, 1913.

Application filed January 9, 1911. Serial No. 601,510.

*To all whom it may concern:*

Be it known that I, GEORGE GILBERT BELL, a subject of the King of Great Britain, residing at 14 Addison Court Gardens, Kensington, in the county of London, England, have invented new and useful Improvements in Electric Heat-Conserving, Heating, and Cooking Apparatus, of which the following is a specification.

This invention relates to improvements in electric heat conserving, heating and cooking apparatus and primarily concerns that type of apparatus which comprises a heat accumulator consisting of a mass of a material having a high specific or latent heat value and being also a good conductor of heat, such as iron or other suitable metal inclosed by an outer covering of heat nonconducting material and furnished with an electrical heating element designed to supply heat at a slow rate which may be advantageously embedded in the mass.

The object of the present invention is to provide an apparatus of this class which will enable the heat accumulator to be employed for baking or cooking food and, if desired for heating water and for other purposes. In the case of cooking and more especially baking, the heat accumulator radiates heat as distinct from heating air and the baking consequently takes place by the heat radiated and not owing to contact with heated air.

According to these improvements an oven or baking space is provided in proximity to the heat accumulator by making the heat accumulator hollow, the opening in the lower part being adapted to be closed by a disk or plug of heat non-conducting material or the heat accumulator may be of inverted cup shape, the opening in the bottom being adapted to be closed by a disk or plug of heat non-conducting material which constitutes the floor of the oven or baking chamber. A tank or pipes may be arranged in proximity to the heat accumulator, and suitably in the upper part of the apparatus, so that cold water for instance may be supplied to such tanks or pipes and led off therefrom in a heated condition, either for use or to be further heated in a chamber or space formed in or in connection with a thermal accumulator before being used.

In order to still further economize and conserve the heat, the heat accumulator can be surrounded by a sheath of metal, say iron, which is in good metallic contact or heat conductive connection with the tank on the top. The sheath is preferably separated from the accumulator by a heat insulator and is again coated with heat insulating material on the outside. This sheath may be said to act as a heat insulator by intercepting the heat escaping from the mass or block and conducting same to the water in the tank above. The effect is equivalent to lagging the block and cooker with a water jacket but is made at less cost and occupies less space. The water in the tank above keeps down the temperature of the iron sheath and prevents the escape of a large amount of heat. If desired, however, other arrangements of heat conductors depending from the tank may be substituted for a sheath.

Figure 1 of the accompanying drawings is a perspective view of a combined water heater and cooking apparatus constructed according to this invention, and Fig. 2 is a sectional elevation thereof while Fig. 3 is a sectional elevation of a modification.

As shown in Figs. 1 and 2, the thermal mass or heat accumulator $a$ is made hollow to constitute an oven and provided at the lower part with a door $b$ hinged at $c$ having a handle and pivoted latch $d$ adapted to take over the catch $d'$ in the closed position. The outside or it may be the frame of the door is suitably made of iron and has a plug $e$ of heat non-conducting material to close the opening to the oven, the object in having the door as low as possible being to retain as much heat as possible when the door is opened. The heat accumulator is surrounded by a jacket or coating of heat non-conducting material $k$, and the whole apparatus suitably rests on a base $f$ which may be of cast iron, or it may be brickwork or other suitable material. The oven may be heated by an electric resistance $g$ embedded in the accumulator $a$ or there may be an electric heating coil surrounding the thermal mass, and in addition to either one of these heating means there may be another electric resistance or heating unit $h$ within the upper part of the space forming the heating chamber of the oven for use when the accumulated heat in $a$ has become decreased to too great an extent or if heat is quickly required, and $h'$ is a switch to connect and disconnect the heater $h$ to and from the source of electricity. It is advantageous to combine with such a device a water heater for which purpose above the metal mass $a$, a cavity may be provided in the heat non-conductor $k$, in which cavity a water tank $i$ is arranged, a cold water supply pipe $l$ being conveniently arranged to pass through a heat non-conductor or lagging $w$ to the water tank $i$, while the warm water delivery pipe $m$ is led away from near the top of the tank $i$ downward and through the heat insulating material $w$ to a duct which may be in the form of an annular chamber $n$, or a coil or otherwise in a heat accumulator $o$ from whence it passes by a pipe $p$ to the mixing cock $q$, which is also connected to the tank $i$ by a pipe $r$. The heat accumulator $o$ is suitably heated by an electric heater or resistance $s$ also capable of converting electricity into a relatively small quantity of heat so that the rate of heat supply is slow.

Instead of one supply pipe $l$ and one delivery pipe $m$, a number of smaller pipes may be arranged in the covering of heat non-conducting material $k$. In use, the articles to be baked may be placed upon the bottom of the oven formed in the heat accumulator $g$ or upon a shelf supported by brackets such as $t$, or be suspended from a hook such as $u$ (Fig. 2) in the top of the oven. The cold water is conducted by the pipe $l$ through the heat insulator $w$ into the tank $i$ where it is heated to a certain extent and then passes out by the pipe $m$ from the top of the tank whence it is delivered to the annular space or chamber $n$ in the heat accumulator $o$, from which chamber the heated water or steam may be drawn off by the pipe $p$ as desired.

To further economize and conserve the heat, the heat accumulator or accumulators, if there be more than one, is or are surrounded by a sheath $v$ of iron, which is in good metallic contact with the tank $i$ on the top. The sheath is preferably separated from the heat accumulator by the heat insulating material $k$ and is again coated with heat insulating material $w$ on the outside being also provided with a metal disk or diaphragm $x$ between the two heat accumulators $a$ and $o$ and the disk $y$ at the bottom. This sheath as aforesaid acts as a heat insulator by intercepting the heat escaping from the accumulators $a$ and $o$ and it conducts the said heat to the water in the tank $i$ above. Preferably the apparatus is surrounded by a thin metal casing $z$ to prevent damage to the heat non-conducting material $w$.

As shown in Fig. 3, the heat accumulator $a$ is of inverted cup-like form, with a covering of heat non-conducting material $k$ supported, for example, upon the base 28 of brickwork or other suitable material, and the plug or disk for closing the bottom opening of the inverted cup-like chamber 19 comprises a disk 29 of heat non-conducting material and an upper disk $29^a$ of metal and may be engaged in that opening in any suitable manner, or both the parts 29 and $29^a$ may be made of metal. The plug may be hinged at the bottom of the chamber 19 or it may be carried as shown by chains 30 and counterweights 31 passing over pulleys 32 the chains being connected to a plate or cross bar 33 fixed to a vertical guide rod 34 fixed to the plug 29 and guided in a fixed tube 35. Or the plug 29 may be raised and lowered in any other convenient manner. The oven may be heated by an electric resistance 36 embedded in the mass $a$ or there may be an internal electric resistance or heater 37 inside of the oven space or both and $37^a$ is a switch for the heater 37. Moreover there may be in addition to one or both of the heaters above mentioned an electric heater or resistance 38 in the base or bottom 29 of the metal chamber 19 principally to give a bottom heat, and as this heater 38 is not necessarily always in use, there may be a hand switch $39^a$, or any other suitable electric heating means may be employed for heating the accumulator and oven.

An objection to many domestic cookers both gas and electric has been that the top and bottom of the oven were not simultaneously heated high enough, so that cakes requiring quick baking could not be baked at all or were but poorly baked. I have overcome this objection as the domestic cooker herein shown can be heated at the top and bottom, as well as by the extra heater 37 and perfect baking results attained either for quick or slow baking. It is advantageous to combine with such a device a water heater, and above the metal mass $a$ a cavity may be provided in the heat non-conductor $k$ in which cavity a water tank 39 may be arranged, a cold water supply pipe 40 being conveniently arranged to pass through the heat-non-conductor to the water tank 39 while the warm water delivery pipe 41 is led away from near the top of the tank downward through the heat non-conducting material $k$ to an annular chamber, 42, or a coil in the heat accumulator 43, from whence it passes by a pipe 44 to the mixing cock 45, which is also connected to the water tank 39 by a pipe 50. The heat accumulator 43 is suitably heated by an electric heater element or resistance 46. In use, the articles to be baked or cooked may be arranged upon the plug or disk 29 aforesaid, and the latter raised into the aperture of the inverted cup-like chamber.

The cold water may be first of all led by the pipe 40 through the heat insulator $k$ into the bottom of the tank 39, and the pipe 41 may draw off from the top of the tank, and deliver to the annular duct or other appropriately formed space 42 in the block 43 aforesaid, from which latter the heated water or steam may be drawn off by the pipe 44 as desired. The heat accumulators $a$ and 43 are surrounded by a sheath 47 of iron which is in good metallic contact or heat conductive connection with the tank 39 on the top, and outside of the sheath is a covering of heat insulating or non-conducting material 48. The sheath 47 is as in the previous example provided with an iron diaphragm or partition marked 49 and with a disk or bottom 51 also of iron or the like. Outside of the sheath 47 the heat insulating material 48 is suitably inclosed in a metal or other casing 52. The pipe 190 provided with a cock is for the purpose of allowing the steam in the oven to escape or to permit of the exit of a certain amount of hot air to regulate the heat if required.

It will be understood that the figures only illustrate typical forms of apparatus for storing electrically generated heat and imparting such heat to a heat accumulator or accumulators which in turn communicate it to air, liquid or other medium as and when required, and that many variations are possible without departing from the invention.

It is to be noted that the heating elements $s$, $g$, 46, 36 and 38 are preferably so dimensioned that their rate of heat supply is generally insufficient to effect the cooking or the heating of the water to high temperature, the heat accumulators accumulating the relatively small quantity of heat, or the heat supplied by them at a slow rate for a long period of time so that the aggregate amount of heat collected by these accumulators will be sufficient to effect the cooking operations that consume shorter periods of time. In other words these heating elements or coils are preferably intended to operate continuously during periods of light load and to be automatically cut out at periods of peak load.

What I claim as my invention and desire to secure by Letters Patent is:—

1. In an electric cooker, the combination of a heat storage mass of high specific heat having the shape of an inverted cup, the hollow interior space forming an oven for cooking purposes, a vertically movable plug to form a closure and opening for the oven, and means for electrically heating the heat storage mass.

2. Apparatus for electrically heating and cooking comprising a heat accumulator formed as an oven, a separate thermal mass for heating water and a shallow tank for the preliminary heating of the water arranged above or in proximity to the said mass.

3. In apparatus for electrically heating and cooking, the combination with a heat accumulator or accumulators, a tank for containing water to be heated, a good heat-conductor such as metal sheath embedded in heat insulating material and in good metallic connection with the said tank.

4. Apparatus for electrically heating and cooking comprising a heat accumulator having a cooking chamber formed therein, means to heat the same at a slower rate than the heat consumption during cooking operations and additional electric means contained within the cooking chamber of said accumulator for temporarily and rapidly increasing the heat within said chamber.

5. The combination with a heat accumulator for accumulating large quantities of heat, of a water tank remote to said accumulator for preliminarily heating the water contained therein and heat conducting means in conductive relation to the tank and in proximity to the accumulator, whereby heat escaping from said accumulator will be conducted by said conducting means to the tank.

6. In an electric cooker, the combination of a heat storage mass capable of storing large quantities of heat and having an internal cooking chamber, of an auxiliary electrical heating element in the cooking chamber to supply heat thereto, the rate of heat supplied by said element being generally insufficient to effect cooking operations, the cooking being mainly effected by the heat stored in the accumulator.

7. In an electric cooker, the combination of a heat storage mass of high specific heat having a hollow interior space adapted to form an oven for cooking purposes, means for electrically heating the storage mass, a closure for the oven, and means for heating the closure.

8. In an electric cooker, the combination of a heat storage mass of high specific heat having a hollow interior space adapted to form an oven for cooking purposes, a closure therefor, electric means for heating the closure, and electric auxiliary means for heating the oven.

9. In an electric cooker, the combination of a heat storage mass of high specific heat having a hollow interior space adapted to form an oven for cooking purposes, an electric heating element in the heat storage mass, an electric heating element in the top of the oven space, and a removable plug to furnish a closure and opening for the oven and an electric heating element in the plug.

10. The combination with a heat accumulator, of a water tank, a supply pipe for the water tank, a duct in the accumulator, means to connect the duct with the tank to supply water from the tank to the duct, means to electrically heat the accumulator by supplying the heat thereto at a low rate, a mixing cock, means independent of the supply pipe of the tank to connect said cock to the tank to discharge water from the tank through the mixing cock and means connecting the cock to the duct for the discharge of water from the duct through the mixing valve.

11. In an electric cooker, the combination of a heat storage mass of high specific heat having a hollow interior space adapted to form an oven for cooking purposes, means for electrically heating the storage mass, a removable floor to the oven to furnish closure and means of access to the oven, and guides and counterweights for the floor.

12. In apparatus for heating water, the combination of a heat storage mass of high specific heat, a water channel therein, an electric heating element for said mass, a preliminary heating tank adapted to intercept heat escaping from the heat storage mass and to cause it to heat water in the tank, a duct from the preliminary heating tank to the water channel of the heat storage mass, means for supplying cold water to the preliminary heating tank, and means for discharging hot water or steam from the water channel.

13. In apparatus for heating water, the combination of a heat storage mass of high specific heat, a water channel therein, an electric heating element for said mass, a preliminary heating tank adapted to intercept heat escaping from the heat storage mass and to cause it to heat water in the tank, a duct from the preliminary heating tank to the water channel of the heat storage mass, means for supplying cold water to the preliminary heating tank, a mixing discharge cock, and pipes leading to it, one from the water channel and the other from the preliminary heating tank, whereby water of different temperatures, as desired, may be obtained.

14. In apparatus for heating water, the combination of a heat storage mass of high specific heat, a water channel therein, an electric heating element for said mass, a preliminary heating tank for the water, heat non-conducting material surrounding and embedding said heat storage mass, a preliminary heating tank, and a conducting sheath surrounding said heat storage mass and embedded in the non-conducting material and having heat conducting connection with said preliminary tank, whereby heat escaping from the heat storage mass will be intercepted by the sheath and conducted to the preliminary tank to assist in heating the water therein.

15. In heating apparatus, the combination of a heat storage mass of high specific heat, means for electrically heating the same, a water heating tank, heat non-conducting material surrounding and embedding said heat storage mass, and a heat conducting sheath surrounding said heat storage mass and embedded in the non-conducting material and having heat conducting connection with said water tank, whereby heat escaping from the heat storage mass will be intercepted by the sheath and conducted to the water tank to assist in heating the water therein.

16. In apparatus for cooking, the combination of a heat storage mass of high specific heat containing a hollow interior space adapted to form an oven for cooking purposes, means for electrically heating said storage mass, a heat storage mass of high specific capacity, a water channel therein, an electric heating element for said mass, a preliminary heating tank for the water, heat non-conducting material surrounding and embedding both of the heat storage masses and the preliminary heating tank, a heat conducting sheath surrounding said heat storage masses, embedded in the non-conducting material, and having heat conducting connection with the preliminary heating tank, whereby heat escaping from the heat storage masses will be intercepted by the sheath and conducted to the preliminary heating tank to assist in heating the water therein.

17. In apparatus for cooking, the combination of a heat storage mass of high specific heat containing a hollow interior space adapted to form an oven for cooking purposes, means for electrically heating said storage mass, a heat storage mass of high specific capacity, a water channel therein, an electric heating element for said mass, a preliminary heating tank for the water, heat non-conducting material surrounding and embedding both of the heat storage masses and the preliminary heating tank, a heat conducting sheath surrounding said heat storage masses, embedded in the non-conducting material, and having heat conducting connection with the preliminary heating tank, the said sheath having connecting cross pieces of the same conducting material in proximity to the heat storage masses, whereby heat escaping from the heat storage masses will be intercepted by the sheath and conducted to the preliminary heating tank to assist in heating the water therein.

In testimony whereof I have signed my name to this specification in the presence of two subscribing witnesses.

GEORGE GILBERT BELL.

Witnesses:
W. MORBEY,
C. P. LEDDON.